No. 697,072. Patented Apr. 8, 1902.
A. C. DAVIS.
SCARECROW.
(Application filed Feb. 1, 1902.)
(No Model.)

Witnesses

A. C. Davis, Inventor.
by C. A. Snow & Co.
Attorneys

UNITED STATES PATENT OFFICE.

ALEXANDER C. DAVIS, OF LAFAYETTE, INDIANA.

SCARECROW.

SPECIFICATION forming part of Letters Patent No. 697,072, dated April 8, 1902.

Application filed February 1, 1902. Serial No. 92,217. (No model.)

*To all whom it may concern:*

Be it known that I, ALEXANDER C. DAVIS, a citizen of the United States, residing at Lafayette, in the county of Tippecanoe and State of Indiana, have invented a new and useful Scarecrow, of which the following is a specification.

The invention relates to a scarecrow.

The object of the present invention is to provide a simple and inexpensive device designed to be mounted on a post or other support in a corn-field or at any other desired place and adapted to be operated by the wind and capable of flashing sunlight or lamplight over a field or other area, whereby crows and other birds and animals which destroy grain or the like will be frightened and prevented from entering such field or inclosure.

The invention consists in the construction and novel combination and arrangement of parts hereinafter fully described, illustrated in the accompanying drawings, and pointed out in the claims hereto appended.

Figure 1:
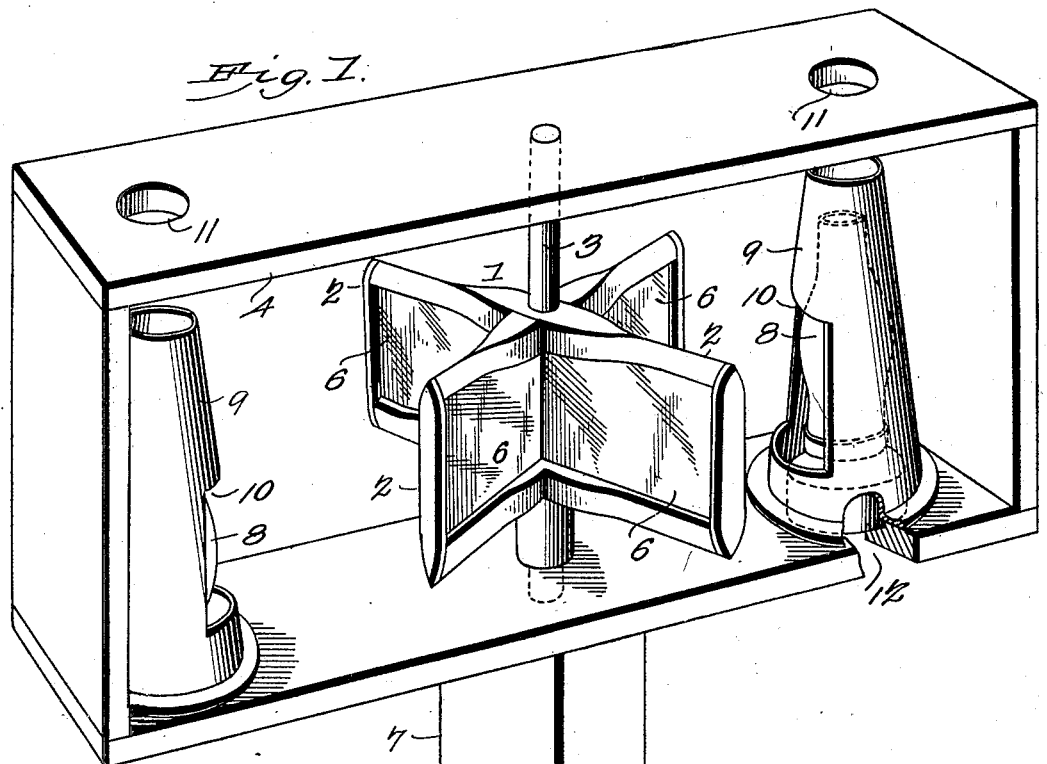
Figure 2:
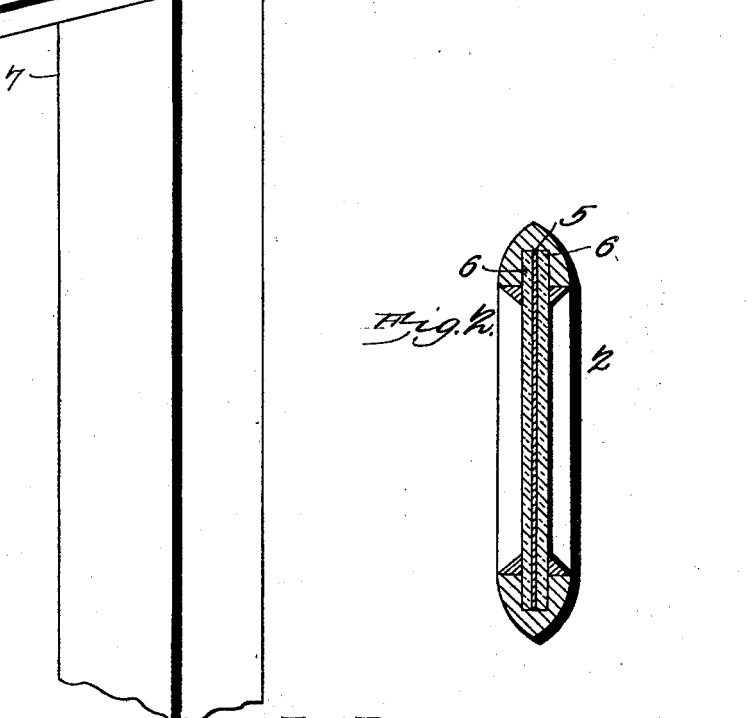

In the drawings, Figure 1 is a perspective view of a scarecrow constructed in accordance with this invention. Fig. 2 is a detail sectional view illustrating the construction of the mirrors of the wheel.

Like numerals of reference designate corresponding parts in all the figures of the drawings.

1 designates a horizontal wheel consisting of a series of blades 2, extending radially from a vertical shaft 3, which is journaled in suitable bearings of a casing 4; but it may be mounted in any other desired manner, either with or without a casing. The casing, which is rectangular or oblong, as clearly illustrated in Fig. 1 of the drawings, is open at opposite sides and is designed to be secured to a post or support, and it is provided at its top and bottom with bearings for the shaft.

The horizontally-disposed rotary wheel is adapted to be rotated by the wind acting on the blades, and the latter are provided at opposite sides with mirror-faces or light-reflecting faces, whereby when the wheel rotates light will be reflected and thrown across a field or inclosure, thereby frightening crows and other birds of prey and preventing their depredations. The mirrors or light-reflecting faces may be constructed in any suitable manner; but they preferably consist of a sheet 5 of tin or other lustrous metal, arranged between transparent plates 6 of glass or other suitable material, the transparent plates being adapted to prevent the plate 5 from rusting or otherwise losing its luster. The plates 5 and 6 are arranged in grooves of the frame, which is composed of top and bottom crossed bars centrally connected with the shaft and connected at their ends by vertical bars 7. The ends of the bars 7 are beveled or pointed, and the outer portions of the arms are oppositely beveled, as shown, to facilitate the rays of light striking the reflecting-faces of the rotary wheel. The flashes of light thrown in different directions across a field or inclosure will effectually frighten crows and other birds of prey and prevent the same from entering a field or inclosure, and in order to enable the device to operate at night lamps 8 may be employed. The blades are arranged at right angles, preferably, and the light, striking the mirror or reflecting-face of one blade at an angle, will be directed upon the opposite or adjacent mirror or reflecting-face of the next blade and will be thrown backward therefrom across the field or inclosure. The lamps 8, which may be of any desired construction, are arranged within tapering casings 9, cut away adjacent to the rotating mirrors or reflecting-faces to provide apertures 10 and arranged in alinement with apertures 11 and 12 of the top and bottom of the casing to provide the necessary draft. Ordinary lamps or signal-lanterns may be used, and the flashes of light thrown across the field, garden, or the like will not only prevent mice, rats, gophers, and other animals from entering such inclosure, but will also serve to deter thieves from entering the same.

It will be seen that the scarecrow is exceedingly simple and inexpensive in construction, that it is adapted to be readily mounted on a post, tree, or other suitable support, and that it is adapted to be rotated by the wind, whereby flashes of light are thrown across the field in various directions, thereby preventing birds of prey from venturing near and also deterring animals from fields, especially when used during the night time. Also it will be clear that the wheel having a plurality of mirror or light-reflecting faces may be suspended from any suitable support and that it is adapted to rotate freely on the shaft, which may be either journaled in bearings or swiveled to a hanger or support or fixed to the latter to permit the wheel to rotate on it. The scarecrow is also particularly adapted for protecting chickens from hawks and various animals, and it will prevent such animals from approaching either by day or night.

Changes in the form, proportion, size, and the minor details of construction within the scope of the appended claims may be resorted to without departing from the spirit or sacrificing any of the advantages of this invention.

What I claim is—

1. A device of the class described provided with a plurality of rotating light-reflecting faces or mirrors, arranged at an angle to one another and adapted to throw light from one to the other, whereby the light is flashed in various directions and is deflected, substantially as and for the purpose described.

2. A device of the class described comprising a rotary wheel provided with a series of blades arranged to be acted on by the wind, whereby the wheel is rotated, said blades being arranged at an angle to one another and being provided with opposite light-reflecting faces or mirrors, substantially as described.

3. A device of the class described comprising a rotary wheel having vertical blades adapted to be engaged by the wind and provided with opposite light-reflecting faces or mirrors, and lighting devices located at opposite sides of the wheel, substantially as described.

4. A device of the class described comprising a rotary wheel having a plurality of light-reflecting faces or mirrors, and means for throwing light upon the wheel, whereby flashes of light will be thrown in various directions by the said wheel, substantially as described.

5. A device of the class described comprising a casing, a rotary wheel mounted in the casing and provided with a plurality of light-reflecting faces or mirrors, lamps located at opposite sides of the wheel, and tubular casings surrounding the lamps and provided with apertures facing the wheel, said tubular casing being opaque and forming shields for the lamps, substantially as described.

In testimony that I claim the foregoing as my own I have hereto affixed my signature in the presence of two witnesses.

ALEXANDER C. DAVIS.

Witnesses:
EDWARD S. FOLTZ,
JOS. FOUSMAN.